F. E. ARNDT
Aug. 18, 1931. STEERING GEAR FOR ROAD GRADERS Re. 18,150
Original Filed Oct. 25, 1927 2 Sheets-Sheet 1
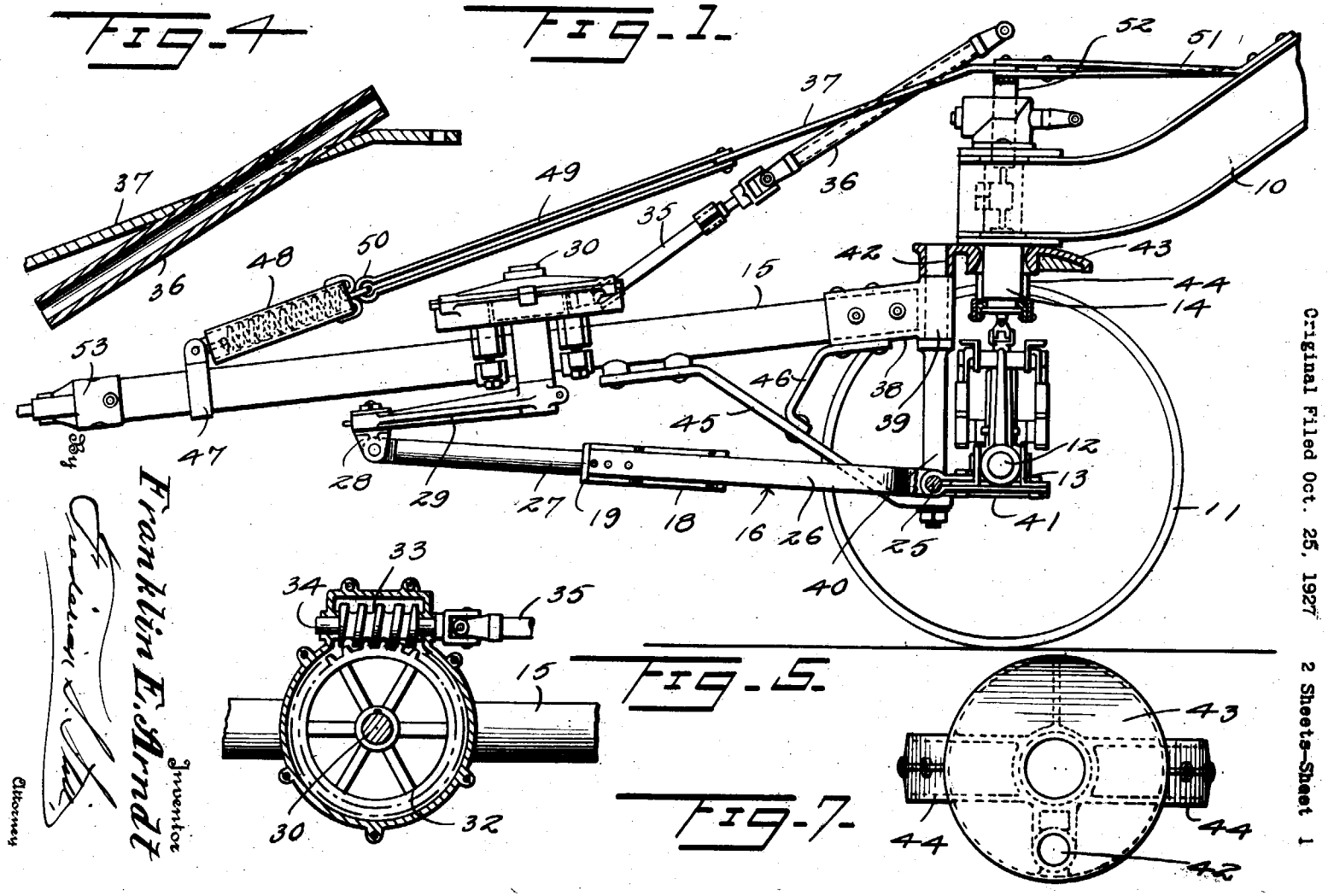
Inventor
Franklin E. Arndt
By Frederick S. Stell
Attorney F. E. ARNDT
Aug. 18, 1931. STEERING GEAR FOR ROAD GRADERS Re. 18,150
Original Filed Oct. 25, 1927 2 Sheets-Sheet 2
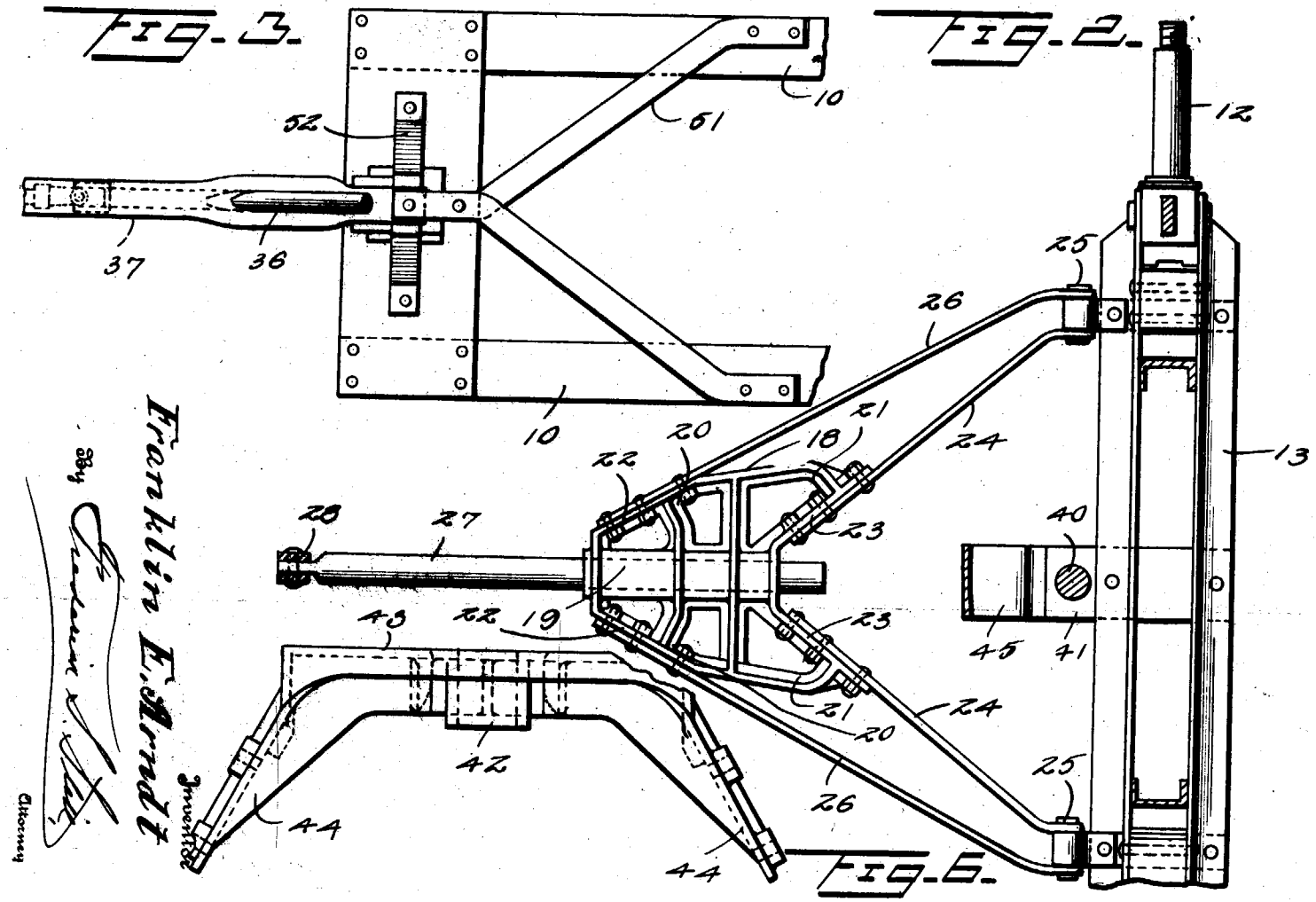
Inventor
Franklin E. Arndt
By Frederick S. Stein
Attorney Reissued Aug. 18, 1931

Re. 18,150

UNITED STATES PATENT OFFICE

FRANKLIN E. ARNDT, OF GALION, OHIO, ASSIGNOR TO THE GALION IRON WORKS & MFG. CO., OF GALION, OHIO, A CORPORATION OF OHIO

STEERING GEAR FOR ROAD GRADERS

Original No. 1,700,015, dated January 22, 1929, Serial No. 228,674, filed October 25, 1927. Application for reissue filed September 27, 1930. Serial No. 484,911.

This invention comprehends certain new and useful improvements in steering gear for road graders, and relates especially to improvements in that type of steering gear which is covered by my Patent No. 1,551,628, which was issued on September 1, 1925.

In this type of road grader there is a draft pole and a stub tongue, the latter being braced to the front axle and the draft pole being free to swing to the right or to the left under the control of the operator, relative to the stub tongue, whereby when the grader is being drawn along the road to be operated upon, as for example, by a tractor attached to the forward end of the draft pole, the latter may be caused to assume and maintain an angular position relative to the machine so that while the tractor is traveling along the middle or crown of the road, the grader will be drawn along the side of the road as, for example, that portion of the road adjacent one of the ditches and be held in this position against side draft and without any tendency of the grader being skewed around or drawn out of its proper operative position.

In the patented steering gear above mentioned, the draft pole has the pivot upon which it is mounted to swing laterally coincident with the hollow king pin of the front axle, and the stub tongue projects forwardly through a block which is mounted to slide longitudinally thereon, this block being pivotally carried on the end of a crank arm which in turn is carried by a vertical shaft supported by the draft pole.

In my present invention, as will be hereinafter more fully pointed out, the rear end of the draft pole has its pivot on a vertically disposed pin which is mounted in advance of the king pin in such a manner as to positively preclude any liability of interference with the normal functions of the king pin, this arrangement resulting in a very sturdy and efficient construction.

Furthermore, the present invention differs from the patented one in that in the new structure the stub tongue does not project forwardly through the block hereinbefore mentioned, and therefore does not have any objectionable forward projection which may be claimed to be in the way or liable to strike some obstruction in the road, the present invention comprising in this regard a stub tongue which is provided with a sleeve or tubular member in which a bar is adapted to slide longitudinally, said bar being pivotally connected at its forward end to the end of the crank which is supported by and from the draft pole, and extending rearwardly from its pivot point into the sleeve or tubular member just mentioned, so that whatever projection of the parts is effected in the sliding movement between the bar and the stub tongue, is a rearward projection within the plane of the frame-like stub tongue itself, and there is no forward projection of the stub tongue, as in the patented construction above mentioned.

Thus it will be understood that my present invention has for its object to provide certain improvements upon the construction of my former Patent No. 1,551,628, and in order that these improvements may be better understood, I shall now refer to the following detailed description and to the accompanying drawings, in which Figure 1 is a side elevation of the front portion of a road grader embodying the invention, parts being shown in section;

Figure 2 is a horizontal sectional view showing the stub tongue in plan;

Figure 3 is a detail top plan view;

Figure 4 is a detail section of some of the parts shown in Fig. 3;

Figure 5 (Sheet 1) is a detail horizontal sectional view through the housing for the worm gear and worm that are carried by the draft pole;

Figure 6 is a detail elevation of the plate 43 hereinafter described; and

Figure 7 (Sheet 1) is a top plan view of the said plate.

In the accompanying drawings, in which I have illustrated only so much of a road grader as is necessary to illustrate the present improvements, 10 designates the arched frame bars of the grader, 11 the front wheels, and 12 the front wheel spindles that are operatively connected to the front axle 13, it being understood that I have illustrated this construction in a road grader of the leaning wheel type wherein a hollow construction of king pin, designated 14, is taken advantage of to accommodate the mechanism for leaning or canting the front wheels, and it will be remembered in this connection that I indicate at the outset of the specification that it was one of the objects of my invention to provide an improved steering gear which would not interfere with the normal functions of the king pin.

15 designates the draft pole, and 16 designates generally the stub tongue disposed underneath the draft pole. The stub tongue comprises a skeletonic casting 18 formed along its median line with a longitudinally disposed bar or tubular member 19 and on opposite sides thereof with front and rear side wings, designated 20 and 21 respectively, the side wings 20 having outwardly facing, rearwardly diverging, walls 22, and the rear side wings 21 having corresponding rearwardly diverging, but inwardly facing walls 23. Rear braces 24 are bolted or otherwise rigidly connected at their forward ends to the walls 23, and at their rear ends to the front axle 13 near the end of the latter as, for example, by means of bolts 25 and corresponding front braces 26 are bolted or otherwise rigidly connected at their forward ends to the walls 22 and at their rear ends to the front axle by the same bolts 25, as best illustrated in Fig. 2. This casting 18, with its rear and front braces 24 and 26 and its tubular member 19, comprises the stub tongue proper which as also noted is in the form of a very light and yet very strong and rigid, framework, which is securely braced to the front axle as against any sidewise strain or movement but is free to swing out and down on the pivot bolts 25, before mentioned.

The tubular member 19 receives and accommodates a slide bar 27 which moves freely therein and which has, by means of the casting 28, a universal joint connection with the relatively free end of a crank 29.

This crank 29 is carried by the lower end of a vertically disposed shaft 30 which is mounted in a housing 31 carried by the draft pole intermediate the ends of the latter, said shaft being provided within the housing with a worm gear 32 meshing with a worm 33 secured to the forward end of a shaft 34, and this shaft 34 has a universal joint connection with a sectional operating shaft 35, one section of which is journaled within a tube 36, extending upward and rearward through an opening formed to receive it in a bar 37 hereinafter more specifically referred to, said shaft finally extending rearward to the operator's platform or station where it is manipulated by means of a hand wheel or crank (not shown).

The draft pole 15 has its rear end set in a socket member 38 formed at its rear end with a bearing sleeve 39 which is mounted upon the shouldered upper end of a vertically disposed pin 40, and the lower end of this pin has a step bearing in the forwardly projecting end of a supporting plate 41 which is bolted or otherwise secured to the underside of the front axle 13. The upper end of the pin 40 has a bearing in an opening 42 formed in a bolster plate or disk 43 which forms the middle portion of an arch 44 which is supported above, but on or from, the front axle 13, this arch 44 constituting in effect the bolster.

Preferably the rear end of the draft pole is braced by means of a main brace 45 and an intermediate brace 46, as best illustrated in Fig. 1, and it is provided near its forward end with a band or collar 47 to which a helical spring 48 is attached at one end, said spring extending rearward from the collar 47 above the draft pole and connected at its rear end to a long yoke 49 formed of a bar doubled upon itself to provide at its forward end a connecting eye 50, the rear end of the yoke being apertured and bolted or otherwise connected to the bar 37 thereinbefore mentioned.

The rear end of this bar 37 is connected to a forked bracket or brace 51, the bifurcated ends of which are riveted or otherwise connected to the forward ends of the frame bars 10, and the front end of this brace 51 and the adjoining rear end of the bar 37 are supported upon the transversely extending arched bracket 52. In this way the draft pole 15 is supported yieldingly or under tension at its forward end.

53 designates a shear block and link which is mounted upon the forward extremity of the draft pole for attachment to a tractor.

From the foregoing description in connection with the accompanying drawings, it will be understood that as it is desired to swing the draft pole 15 to the right or to the left, the shaft 35 is rotated by the operator on the rear platform of the grader, the motion of the shaft 35 being transmitted through the shaft 30 to the crank 29 so as to swing the pole in the desired direction relative to the stub tongue 16, and manifestly as the crank 29 swings around the slide bar 27 will move longitudinally within the tubular member 19 of the stub tongue, and after the desired adjustment has been effected, the parts will be securely held in adjusted position without the necessity of any special locking devices and the front axle of the grader will be held securely in the desired line of draft irrespective of the position of the tractor.

While I have illustrated in the accompanying drawings, what I believe to be the preferred embodiment of my invention, it is to be understood that the invention, is not limited thereto, but that various changes may be made in the construction and arrangement and proportions of the different parts without departing from the scope of the invention as claimed.

What is claimed is:—

1. In an implement of the class described, a frame, an axle, a king pin connecting the frame and axle, a draft pole pivotally connected to the axle for swinging movement relative thereto about an axis substantially parallel to and in advance of the king pin, a stub tongue connected with the axle, and means connecting the tongue and pole for relative angular adjustment.

2. In an implement of the class described, a frame, an axle, a king pin connecting the frame and axle, a second pin supported in connection with the axle substantially parallel to the king pin and in advance of the latter, a draft pole pivoted on said second pin, a stub tongue connected with the axle, and means connecting the tongue and pole for relative angular adjustment.

3. In an implement of the class described, a frame, an axle, a king pin carried by the frame, a fitting carried by the axle and in which the king pin is engaged, a second pin engaged in said fitting in substantially parallel relation to said king pin and in advance of the latter, a draft pole pivoted to said second pin, a stub tongue connected with the axle, and means connecting the tongue and pole for relative angular adjustment.

4. In a mechanism of the character described, a front axle, a bolster for the front axle having a vertically extending socket, a pin operatively supported upon the axle and extending upward into said vertically disposed socket, a sleeve supported on the pin for lateral swinging movement and having a forwardly extending socket, a pole having its rear end disposed in one of said sockets, a stub tongue having its rear end disposed in the other of said sockets, and means connecting the tongue and pole for relative angular adjustment.

5. In a road grader, a framework, a front axle supporting the forward end of the framework and capable of steering movement, a king pin about which the front axle turns, a stub tongue connected to the axle to turn therewith and projecting forwardly therefrom, a vertically disposed pin supported from the axle in advance of the king pin, a draft pole pivoted for lateral movement at its rear end upon said pin, and an operative connection between the draft pole and stub tongue for moving one laterally relative to the other and for holding the same in relative laterally adjusted positions.

6. In a road grader, a framework, a front axle supporting the forward end of the framework and capable of a turning movement for steering, a king pin upon which the front axle turns, a plate surrounding the king pin and supported above the axle, a vertically disposed pin positioned in advance of the king pin and having its upper end mounted in said plate, means for supporting the lower end of said pin from the front axle, a draft pole pivotally mounted at its rear end for lateral swinging movement upon said pin, a stub tongue carried by the axle and projecting forwardly therefrom, and an operative connection between the draft pole and the stub tongue for moving one laterally relative to the other and for holding the same in adjusted positions.

7. In a road grader, a framework, a front axle supporting the forward end of the framework and capable of a turning movement for steering, a king pin about which the axle turns, a plate surrounding the king pin and supported above the axle, said plate being formed in advance of the axle with an aperture, a vertically disposed pin having its upper end mounted in said aperture and its lower end supported from the axle, a draft pole mounted for lateral swinging movement upon said pin, a stub tongue underneath the draft pole and carried by the axle and projecting forwardly therefrom, and an operative connection between the draft pole and stub tongue for swinging the former laterally relative to the latter and for holding the same in adjusted positions.

8. In a road grader, a framework, a front axle supporting the forward end of the framework and capable of a turning movement for steering, a king pin about which the axle turns, a plate surrounding the king pin above the axle and formed in advance of the king pin with an aperture, a vertically disposed pin mounted in its upper end in said aperture and supported at its lower end by the axle in advance of the king pin, the vertically disposed pin being formed with an upwardly facing shoulder, a laterally swinging draft pole mounted upon the upper end of said vertically disposed pin between the plate and the shoulder of the pin, a stub tongue underneath the draft pole and carried by and projecting forwardly from the axle, and an operative connection between the draft pole and stub tongue for laterally adjusting one with reference to the other and for holding the same in adjusted positions.

9. In a road grader, a supporting framework, a front axle capable of turning movement for steering, a draft pole mounted for lateral swinging movement independent of the axle, a stub tongue carried by the axle and projecting forwardly therefrom underneath the draft pole, an operative connection between the draft pole and stub tongue for swinging one relative to the other, the draft pole being provided near its forward end with a collar, a spring connected at its forward end to said collar and extending rearwardly above the pole, a longitudinally extending yoke connected at its forward end to the rear end of said spring, a bar to which the rear end of said yoke is connected, an arched bracket supported above the framework, and a forked bracket having its rear ends secured to the framework and its forward ends resting on said arched bracket, the rear end of said bar also resting on said arched bracket and being connected thereto.

10. In a road grader, a framework, a front axle capable of turning movement for steering, a draft pole capable of lateral swinging movement independently of the axle, a stub tongue underneath the draft pole and carried by the axle and projecting forwardly therefrom, an operative connection between the draft pole and stub tongue for holding one in different laterally adjusted positions relative to the other, an operating shaft for actuating said connection, a rearwardly and upwardly extending tube through which one portion of the shaft extends, a bar formed with an opening through which said tube extends and in which it is secured, means for holding the rear end of said bar, a longitudinally extending yoke connected to the forward end of said bar, and a spring connected at its rear end to the forward end of said yoke and at its forward end to the draft pole.

11. In a road grader, a framework, a front axle supporting the forward end of the framework and capable of steering movement, a king pin by means of which the front axle turns, a stub tongue connected to the axle to turn therewith and projecting forwardly therefrom, a vertically disposed pin supported from the axle in advance of the king pin, a draft pole pivoted for lateral movement at its rear end upon the upper end of said pin, and an operative connection between the draft pole and stub tongue for moving one laterally relative to the other and for holding the same in relative laterally adjusted positions.

12. In a road grader, a framework, a front axle supporting the forward end of the framework and capable of a turning movement for steering, a king pin about which the axle turns, a plate surrounding the king pin and supported above the axle, said plate being formed in advance of the axle with an aperture, a vertically disposed pin having its upper end mounted in said aperture and its lower end supported from the axle, a draft pole mounted for lateral swinging movement upon the upper end of said pin, a stub tongue underneath the draft pole and carried by the axle, and projecting forwardly therefrom, and an operative connection between the draft pole and stub tongue for swinging the former laterally relative to the latter and for holding the same in adjusted positions.

In testimony whereof I hereunto affix my signature.

FRANKLIN E. ARNDT.